(12) United States Patent
Bolkhovitin et al.

(10) Patent No.: US 10,740,181 B2
(45) Date of Patent: Aug. 11, 2020

(54) FAILED STORAGE DEVICE REBUILD METHOD

(71) Applicant: Western Digital Technologies, Inc., San Jose, CA (US)

(72) Inventors: Vladislav Bolkhovitin, San Jose, CA (US); Siva Munnangi, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 276 days.

(21) Appl. No.: 15/913,910

(22) Filed: Mar. 6, 2018

(65) Prior Publication Data

US 2019/0278675 A1   Sep. 12, 2019

(51) Int. Cl.
G06F 11/10   (2006.01)
G06F 11/20   (2006.01)

(52) U.S. Cl.
CPC ...... *G06F 11/1076* (2013.01); *G06F 11/2094* (2013.01)

(58) Field of Classification Search
CPC . G06F 11/1076; G06F 11/108; G06F 12/0269
See application file for complete search history.

(56) References Cited

U.S. PATENT DOCUMENTS

| | | |
|---|---|---|
| 2,388,083 A | 10/1945 | Reswick |
| 5,388,083 A | 2/1995 | Assar |
| 6,092,215 A | 7/2000 | Hodges et al. |
| 7,293,133 B1 | 11/2007 | Colgrove et al. |
| 7,783,600 B1 | 8/2010 | Spertus et al. |

(Continued)

FOREIGN PATENT DOCUMENTS

| | | |
|---|---|---|
| WO | 2014110095 A1 | 7/2014 |
| WO | 2015116197 A1 | 8/2015 |

OTHER PUBLICATIONS

International Search Report and Written Opinion of Internationals Application No. PCT/US2019/035087, dated Sep. 25, 2019, 11 pages.

(Continued)

*Primary Examiner* — Joseph R Kudirka
(74) *Attorney, Agent, or Firm* — Patent Law Works LLP

(57) ABSTRACT

Methods and systems for rebuilding a failed storage device in a data storage system. For example, a method including identifying a first garbage collection group (GCG) in a storage array for garbage collection; extracting valid data and redundancy information from functioning storage devices in the storage array associated with the first GCG; reconstructing data of a failed storage device associated with the first GCG based on the extracted valid data and redundancy information from the functioning storage devices associated with the first GCG; consolidating the extracted valid data from the functioning storage devices and the reconstructed data of the failed storage device associated with the first GCG; writing the consolidated extracted valid data from the functioning storage devices and the reconstructed data of the failed storage device associated with the first GCG to a second GCG in the storage array; and reclaiming the first GCG identified for garbage collection.

20 Claims, 11 Drawing Sheets

(56) References Cited

U.S. PATENT DOCUMENTS

| | | | |
|---|---|---|---|
| 8,289,641 B1 | 10/2012 | Emami | |
| 8,904,261 B2 * | 12/2014 | Cideciyan | G06F 11/108 |
| | | | 714/773 |
| 10,241,722 B1 * | 3/2019 | Malwankar | G06F 3/0659 |
| 10,289,507 B1 | 5/2019 | Malwankar et al. | |
| 10,409,769 B1 | 9/2019 | Malhotra et al. | |
| 2003/0135514 A1 | 7/2003 | Patel et al. | |
| 2005/0080991 A1 | 4/2005 | Keohane et al. | |
| 2005/0114726 A1 | 5/2005 | Ouchi | |
| 2007/0245082 A1 | 10/2007 | Margolus et al. | |
| 2008/0104445 A1 | 5/2008 | Ananthamurthy | |
| 2010/0251073 A1 | 9/2010 | Stolowitz | |
| 2010/0280998 A1 | 11/2010 | Goebel et al. | |
| 2011/0029711 A1 | 2/2011 | Dhuse et al. | |
| 2011/0055178 A1 | 3/2011 | Mark | |
| 2012/0011200 A1 | 1/2012 | Zhang et al. | |
| 2012/0036309 A1 | 2/2012 | Dillow et al. | |
| 2012/0079317 A1 | 3/2012 | Nelogal et al. | |
| 2013/0179753 A1 | 7/2013 | Flynn et al. | |
| 2013/0339599 A1 | 12/2013 | Sundrani | |
| 2014/0237298 A1 | 8/2014 | Pe'er | |
| 2014/0258598 A1 | 9/2014 | Canepa et al. | |
| 2014/0372698 A1 | 12/2014 | Lee et al. | |
| 2015/0205668 A1 | 7/2015 | Sundaram et al. | |
| 2015/0205669 A1 | 7/2015 | Sundaram et al. | |
| 2016/0092309 A1 * | 3/2016 | Gao | G06F 11/108 |
| | | | 714/6.23 |
| 2016/0217040 A1 | 7/2016 | Jin et al. | |
| 2016/0342476 A1 | 11/2016 | Nazari et al. | |
| 2017/0116074 A1 | 4/2017 | Hayes et al. | |
| 2017/0123915 A1 | 5/2017 | Nguyen et al. | |
| 2017/0242785 A1 | 8/2017 | O'Krafka et al. | |
| 2017/0270018 A1 | 9/2017 | Xiao et al. | |
| 2017/0286237 A1 | 10/2017 | Condict et al. | |
| 2017/0329542 A1 | 11/2017 | Chou et al. | |
| 2018/0032446 A1 | 2/2018 | Amarendran et al. | |

OTHER PUBLICATIONS

International Search Report and Written Opinion of Internationals Application No. PCT/US2019/035088, dated Sep. 26, 2019, 10 pages.

International Search Report and Written Opinion of Application No. PCT/US2018/062498, filed Nov. 26, 2018 (20 pages).

* cited by examiner

FAILED STORAGE DEVICE REBUILD METHOD

BACKGROUND

The present disclosure relates to data storage systems. In a more particular example, the present disclosure relates to methods and systems for rebuilding a failed storage device in a data storage system.

Data storage systems such as redundant array of independent disks (RAID) or newer erasure coding architectures typically have a storage device rebuild mechanism for rebuilding failed storage device(s) within the storage system. For instance, in a conventional RAID 5 or RAID 6 storage system where data is striped (i.e., the data is divided into segments and stored consecutively across multiple storage devices within the storage array), rebuilding a failed storage device in the array involves reading the data segments from all of the storage devices in the array that have not failed, reconstructing the lost data from the failed storage device, and then writing the reconstructed data to the replacement storage device. This process is often time consuming and computationally intensive since entire datasets, which could reach hundreds of terabytes (TB), need to be retrieved from the remaining storage devices in the array in order to rebuild the failed storage device. The storage device rebuild process negatively affects normal host traffic, leading up to a 2× performance loss and significant increases in host read/write latency.

SUMMARY

The present disclosure relates to methods and systems for rebuilding a failed storage device in a data storage system. As discussed above, the storage device rebuild process can have a significant impact on data storage system performance. To minimize the impact of the storage device rebuild process on the normal host traffic, the rebuild process activity may be throttled down to around 20% of the normal rebuild level. While this may slightly reduce the impact of the rebuild process on overall system performance, it has a downside of increasing the rebuild time by a significant amount (in this case, by a factor of 5×). During this rebuild time, the data storage system experiences a degraded mode of operation during which, for example, data must first be rebuilt before servicing storage requests for the failed storage device and more operations are required to compute error-correction blocks.

In view of the above, there is a need for a method and system that, for example, rebuilds a failed storage device in a data storage system while mitigating against performance losses such as latency increases during the storage device rebuild process.

Various embodiments of the present disclosure as disclosed herein may perform a failed storage device rebuild including one or more garbage collection operations. In at least some embodiments, the storage device rebuild may be performed within the flow of ongoing garbage collection operations that occur in a periodic and incremental manner as part of the normal maintenance process for storage devices such as solid-state drives. As a consequence of this, one or more embodiments of the present disclosure may provide a number of technical features and advantages, including, but not limited to:

1) A reduction in the processing load and data traffic of the host and data storage system as a result of not having to perform an entirely separate failed storage device rebuild process. This may improve the overall performance of the host and/or data storage system and may also reduce the physical wear on the storage devices in the system.

2) A temporal distribution of the processing load and data traffic as a result of performing the storage device rebuild within the flow of ongoing garbage collection operations in the data storage system. This may improve the quality of service provided by the host and/or the data storage system.

The present disclosure includes, but is not limited to, at least the following aspects:

According to one innovative aspect, a method including identifying a first garbage collection group in the storage array for garbage collection; extracting valid data and redundancy information from one or more functioning storage devices in the storage array that are associated with the first garbage collection group; reconstructing data of the failed storage device that are associated with the first garbage collection group based on the extracted valid data and redundancy information from the one or more functioning storage devices that are associated with the first garbage collection group; consolidating the extracted valid data from the one or more functioning storage devices and the reconstructed data of the failed storage device that are associated with the first garbage collection group; writing the consolidated extracted valid data from the one or more functioning storage devices and the reconstructed data of the failed storage device that are associated with the first garbage collection group to a second garbage collection group in the storage array; and reclaiming the first garbage collection group identified for garbage collection.

According to another innovative aspect, a data storage system including a storage array including a plurality of storage devices; one or more processors; and logic executable by the one or more processors to perform operations comprising: identifying a first garbage collection group in the storage array for garbage collection; extracting valid data and redundancy information from the one or more functioning storage devices that are associated with the first garbage collection group; reconstructing data of the failed storage device that are associated with the first garbage collection group based on the extracted valid data and redundancy information from the one or more functioning storage devices that are associated with the first garbage collection group; consolidating the extracted valid data from the one or more functioning storage devices and the reconstructed data of the failed storage device that are associated with the first garbage collection group; writing the consolidated extracted valid data from the one or more functioning storage devices and the reconstructed data of the failed storage device that are associated with the first garbage collection group to a second garbage collection group in the storage array; and reclaiming the first garbage collection group identified for garbage collection.

According to yet another innovative aspect, a data storage system including a storage array including a plurality of storage devices; means for identifying a first garbage collection group in the storage array for garbage collection; means for extracting valid data and redundancy information from the one or more functioning storage devices that are associated with the first garbage collection group; means for reconstructing data of the failed storage device that are associated with the first garbage collection group based on the extracted valid data and redundancy information from the one or more functioning storage devices that are associated with the first garbage collection group; means for consolidating the extracted valid data from the one or more functioning storage devices and the reconstructed data of the failed storage device that are associated with the first garbage collection group; means for writing the consolidated extracted valid data from the one or more functioning storage devices and the reconstructed data of the failed storage device that are associated with the first garbage collection group to a second garbage collection group in the storage array; and means for reclaiming the first garbage collection group identified for garbage collection.

These and other implementations may each optionally include one or more of the following features: that the one or more of the identifying, extracting, reconstructing, consolidating and writing are performed in a periodic and incremental manner; that determining that a predetermined condition concerning the storage array has been met, and responsive to determining that the predetermined condition concerning the storage array has been met, performing a manual rebuild of valid data of the failed storage device that have not yet been reconstructed; that the predetermined condition concerning the rebuilding of the failed storage device is selected from a group comprising: (1) a rebuild timeout threshold for the failed storage device has been exceeded and (2) one or more garbage collection groups in the storage array have not been written to within a predetermined amount of time; that the storage array comprises one or more solid-state drives; that the storage array is configured as a RAID array; that the storage array is configured to support an erasure coding scheme; and that the storage array includes overprovisioned capacity that is configured as spare space to temporarily store reconstructed data of the failed storage device during the rebuilding of the failed storage device.

Other implementations of one or more of these aspects include corresponding systems, apparatus, and computer programs, configured to perform the actions of the methods, encoded on computer storage devices. It should be understood that language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

FIG. 5A illustrates the RAID 5 storage array at a time t1 during which the storage array is normally operating.

FIG. 5B illustrates the example RAID 5 storage array at a time t2 after an SSD in the array has failed.

FIG. 5C illustrates the example RAID 5 storage array at a time t3 including a replacement for the failed SSD showing a garbage collection operation for a first GCG.

FIG. 5D illustrates the example RAID 5 storage array at a time t4 showing a reclaiming process of the garbage collection operation for the first GCG.

FIG. 5E illustrates the example RAID 5 storage array at a time t5 showing a second garbage collection operation for a second GCG.

FIG. 5F illustrates the example RAID 5 storage array at a time t6 after the failed storage device rebuild process has been completed.

DETAILED DESCRIPTION

Novel data processing technology, such as but not limited to systems, devices, and methods for rebuilding a failed storage device in a data storage system are disclosed. While this technology is described below in the context of a particular system architecture in various cases, it should be understood that the systems and methods can be applied to other architectures and organizations of hardware. More specifically, it should be noted that while the following description is made with reference to certain embodiments, the present disclosure may apply to any data storage system that implements data redundancy and performs garbage collection known or contemplated.

Figure 1:
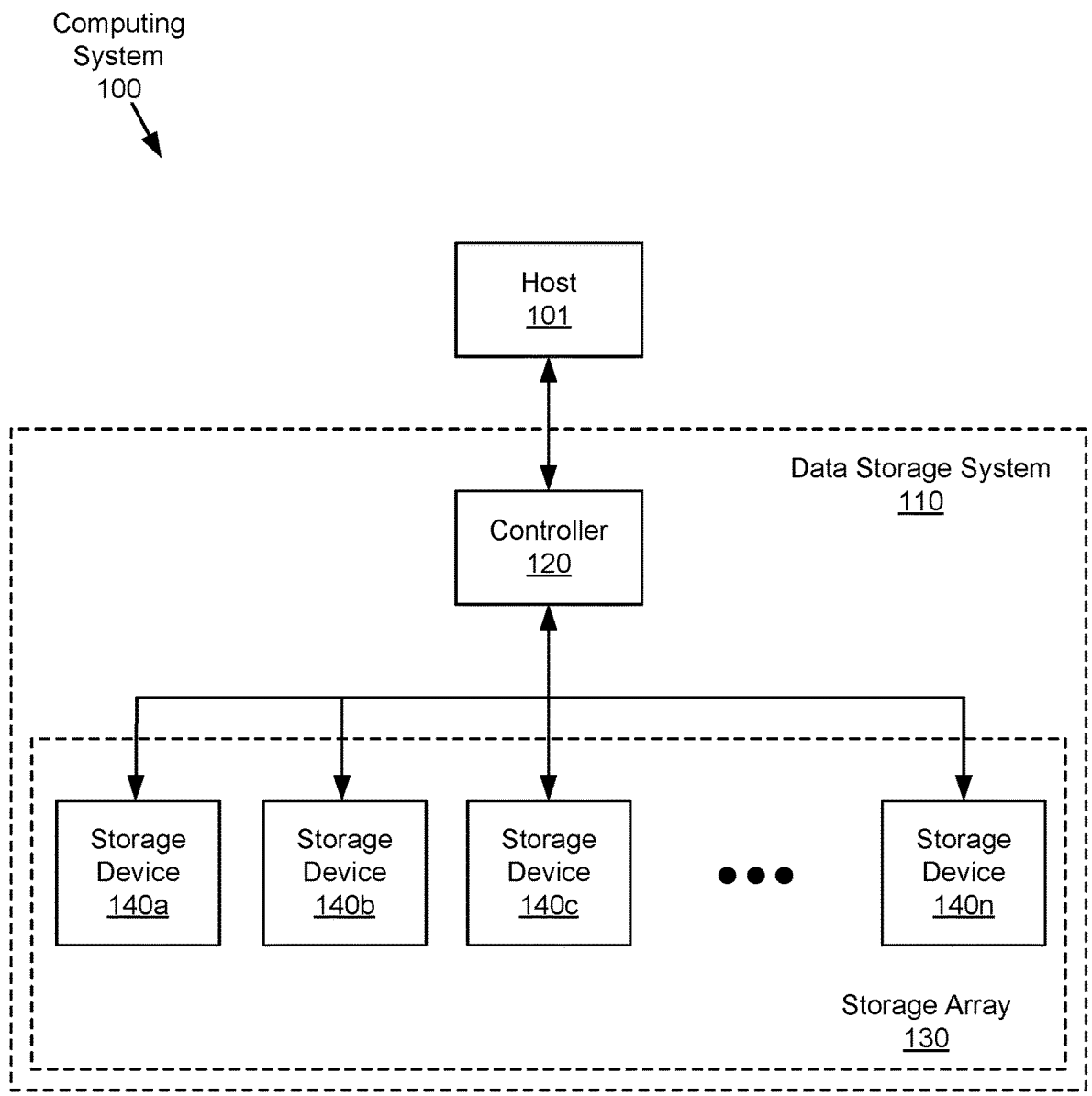
FIG. 1 is a block diagram of an example computing system including a data storage system in accordance with an embodiment.

FIG. 1 is a high-level block diagram illustrating an example computing system 100 including a host 101 that is communicatively coupled to a data storage system 110. The host 101 may be one or more of any suitable computer devices or systems, such as a server computer, a desktop computer, a laptop computer, a tablet computer, a mobile telephone, a portable game player, or any other electronic device capable of making requests to the data storage system 110. In some embodiments, the host 101 may include one or more processors, one or more memory devices, and any other suitable components to add functionality to the host 101. While the example of FIG. 1 shows a single host 101, it should be understood that any number of hosts 101 may be communicatively coupled to the data storage system 110 of computing system 100.

While not shown, the computing system 100 may also include a network for communicatively coupling the host 101 to the data storage system 110. The network may include a local-area network (LAN), wide-area network (WAN), switched fabric network, wired or wireless network, private or public network, etc.

The host 101 may execute one or more applications that make storage requests (e.g., read, write, etc.) to the data storage system 110. In some embodiments, the one or more applications may be dedicated software applications running on the host 101 or may alternatively reside on other suitable computing devices and may be remotely executed by the host 101.

The data storage system 110 may comprise a controller 120 and a storage array 130 including one or more storage devices 140a, 140b, 140c, . . . , and 140n. As described in more detail with reference to FIG. 6 below, the controller 120 may comprise one or more computing devices and software configured to manage the operation of and provide an external interface to (e.g., for communication with the host 101) the storage array 130. For example, and as will be discussed in more detail below, the controller 120 may coordinate and perform various operations on the storage devices 140a, 140b, 140c, . . . , and 140n of the storage array 130 including data redundancy and/or recovery, storage device rebuild and/or garbage collection. In addition, in some embodiments the controller 120 may coordinate communications between the host 101 and the storage array 130, including forwarding read or write requests from the host 101 to the corresponding storage device 140 and retrieving data from the storage devices 140 in a logical manner (e.g., blocks are assembled into a stripe) before being returned to the host 101. The controller 120 may comprise one or more processors, one or more memory devices, and software and/or logic for performing these functions.

The storage array 130 may comprise one or more storage devices 140a, 140b, 140c, . . . , and 140n coupled to the controller 120. Each of the storage devices 140a, 140b, 140c, . . . , and 140n may be a non-transitory, computer-usable (e.g., readable, writeable, etc.) medium or device that can contain, store, communicate, propagate, or transport computer-readable information in any form (e.g., data, programs, instructions, etc.). While, in various embodiments, the storage devices 140 may be solid-state drives (SSDs) containing non-volatile solid-state devices such as flash memories, it should be understood that in some embodiments, the storage devices 140 may include other volatile or non-volatile memory devices with suitable characteristics, such as persistent memory (PM), shingled magnetic recording (SMR) disks, hybrid storage devices, etc.

As will be further discussed below, the storage array 130 may be configured using any suitable redundancy scheme such as RAID 5, RAID 6, or erasure coding, such that if a storage device 140 fails, a storage device rebuild process using a global garbage collection operation may be performed to recover the data from a failed storage device 140 in the storage array 130.

Figure 2:
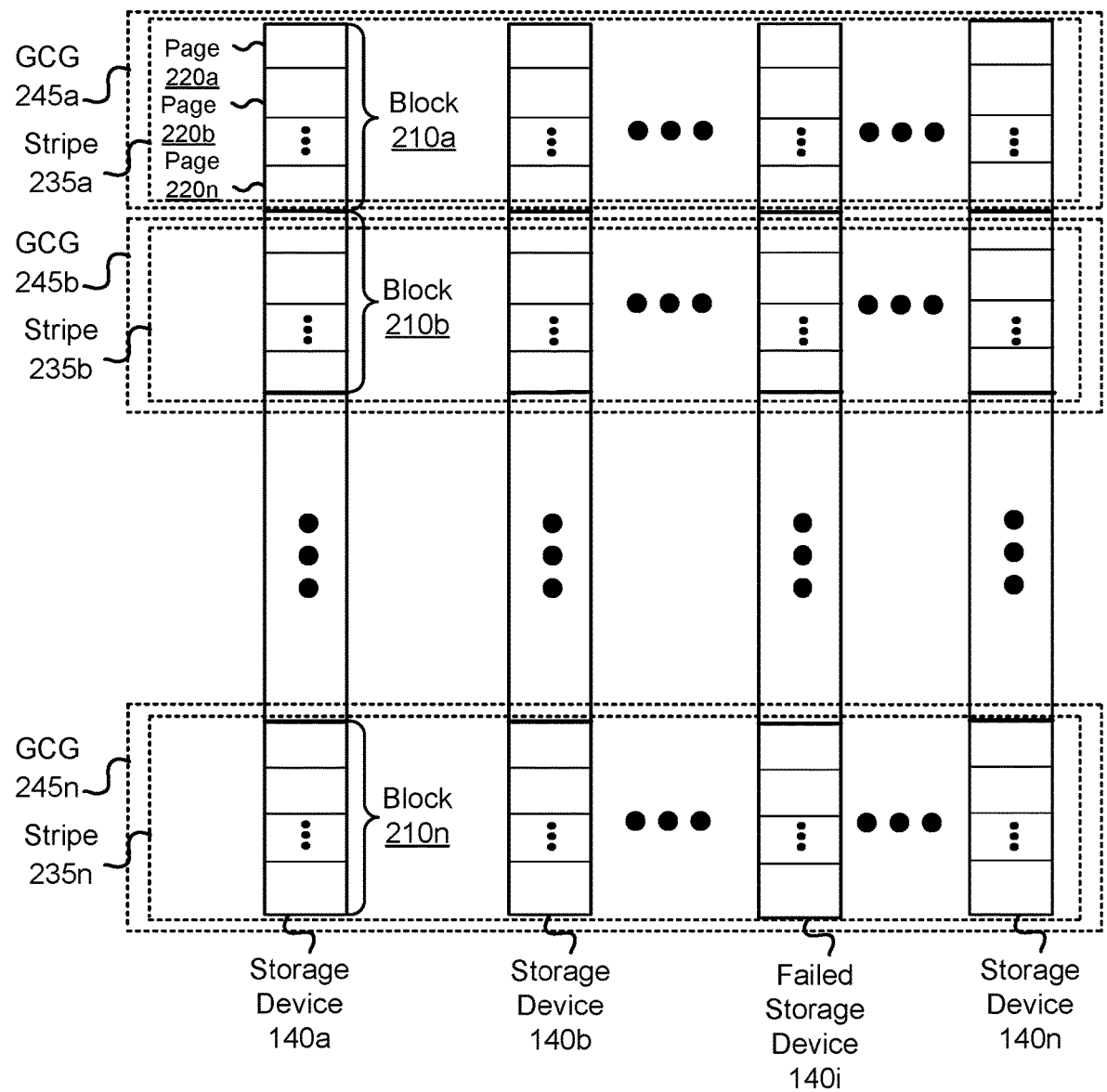
FIG. 2 is a block diagram of an example storage array of the data storage system of FIG. 1 in accordance with an embodiment.

FIG. 2 is a block diagram of an example storage array 130 of the data storage system 110 of FIG. 1 in accordance with an embodiment. The storage array 130 includes a plurality of storage devices 140a, 140b, . . . , 140n, such as SSDs. Each of the storage devices 140 may include a plurality of blocks 210a, 210b, . . . , 210n, each block containing data, redundancy information and/or other forms of computer-readable information. In turn, each of the blocks 210a, 210b, . . . , 210n may be divided into a plurality of pages 220a, 220b, . . . , 220n.

In some embodiments (e.g., the storage devices 140 are SSDs), the pages 220a, 220b, . . . , 220n may be the smallest programmable (e.g., writable) unit of the storage device and are typically 2 kB to 8 kB in size, while the blocks 210a, 210b, . . . , 220n are the smallest unit that can be erased and are typically 128 kB to 1 MB in size. In these embodiments, each page 220 may assume one of three states: 1) a valid state in which data (e.g., "valid data") has been written to the page and is available for read operations; 2) an invalid state in which data (e.g., "invalid data") has been written to the page but has been updated and thus has become stale; and 3) a free state in which no data has been written to the page.

The storage array 130 includes a plurality of stripes 235a, 235b, . . . , 235n, in which each stripe 235 may include corresponding blocks 210 contained in the plurality of storage devices 140a, 140b, . . . , 140n, as illustrated in the figure. In some embodiments, each stripe 235 may be divided into pieces called chunks that are composed of the one or more blocks 210 residing on the same storage device 140.

In some embodiments, each of the stripes 235a, 235b, . . . , 235n may include redundancy information contained in the blocks 210 or pages 220 (depending on whether block-level or page-level parity is used) to provide a level of redundancy such that a failed storage device 140i in the storage array 130 may be rebuilt. As will be explained with reference to FIGS. 5A-5F, in embodiments implementing RAID 5 and RAID 6, respectively, each stripe 235 includes one (or two) parity blocks/pages which supports recovery from a failure of one (or two) storage devices 140 in the storage array 130. In embodiments implementing an erasure coding redundancy scheme, data in the storage array 130 may be broken into fragments that are expanded and encoded (e.g., using Reed-Solomon codes) with redundant pieces of data and stored across a set of different locations.

The storage array 130 may be further arranged as a plurality of garbage collection groups (GCGs) 245a, 245b, . . . , 245n associated with a garbage collection process. Each GCG 245 may comprise the plurality of blocks 210 in the storage devices 140a, 140b, . . . , 140n that are contained in the stripe 235. Garbage collection is a process of memory management that reclaims portions of the storage array 130 that no longer contain valid data. As will be explained in more detail with reference to FIG. 3 and FIGS. 5A-5F, the garbage collection process involves compacting and erasing blocks 210 in the storage devices 140a, 140b, . . . , 140n in GCG 245 so as to free-up continuous usable space in the GCG for future writes.

Figure 3:
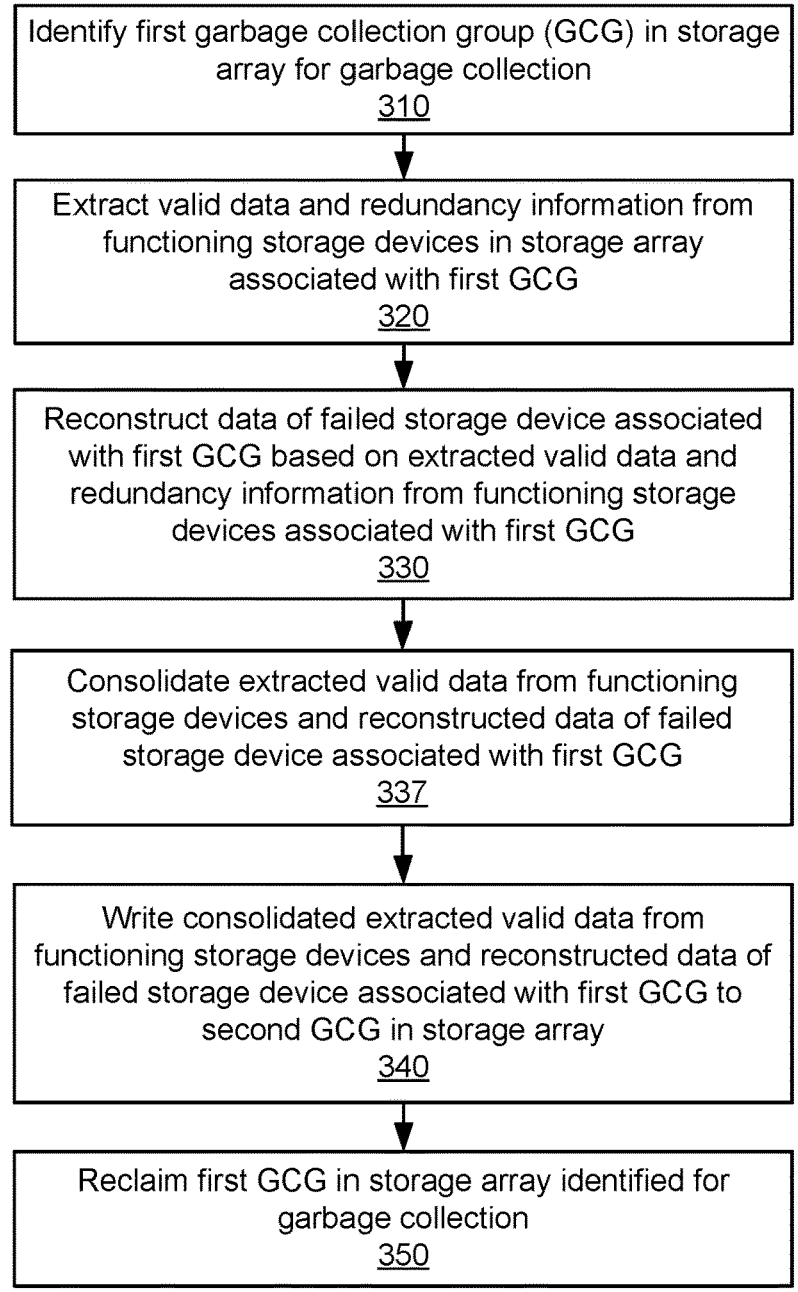
FIG. 3 is a flowchart of an example method for performing a failed storage device rebuild for the storage array of FIG. 2.

FIG. 3 is a flowchart of an example method 300 for performing a failed storage device rebuild for the storage array 130 of FIG. 2. The method 300 may be performed in a periodic and incremental manner as part of an ongoing garbage collection process that occurs during the normal operation of the data storage system 110. The method 300 may be "periodic and incremental" in the sense that the rebuild process may proceed iteratively from one GCG 245 to another within the storage array 130 over a period of time, to be described as follows. In some embodiments, an iteration of the garbage collection operation for a GCG 245 may be triggered by a storage request (e.g., read, write, etc.) from the host 101 to the storage array 130.

In block 310, the controller 120 may identify a first GCG 245 (e.g., GCG 245a) in the storage array 130 for garbage collection. The first GCG 245 may be any one of the plurality of GCGs 245 in the storage array 130 that have not been reclaimed in a prior iteration of the garbage collection process. In an embodiment, the controller 120 may identify the first GCG 245 based on a determination that the number of available pages 220 (i.e., pages in a free state) within the first GCG have decreased and that the first GCG has reached a threshold for garbage collection and needs to be reclaimed.

In block 320, the controller 120 may extract (e.g., read) valid data and redundancy information from the one or more storage devices 140 in the storage array 130 that have not failed (e.g., "functioning" storage devices 140) that are associated with the first GCG 245. As noted above with reference to FIG. 2, in some embodiments the redundancy information may comprise parity blocks or parity pages contained in the stripes 235 within the first GCG. In some embodiments, the controller 120 may temporarily store the extracted valid data and redundancy information in a memory in controller 120.

In block 330, the controller 120 may reconstruct the data of a failed storage device 140i associated with the first GCG 245 based on the extracted valid data and redundancy information from the one or more functioning storage devices 140 in the storage array 130 that are associated with the first GCG 245. In some embodiments, the data of the failed storage device may be reconstructed by performing an exclusive OR (XOR) operation on the extracted valid data and redundancy information.

In block 337, the controller 120 may consolidate the extracted valid data from the functioning storage devices and the reconstructed data from the failed storage device that are associated with the first GCG 245. This consolidation may comprise optimally structuring the combination of the extracted valid data and the reconstructed data for efficient storage to an available stripe within the storage array 130. In some embodiments, the consolidating operation may comprise combining the extracted valid data and the reconstructed data from the first GCG 245 with valid data and/or reconstructed data from a partially filled stripe 235 to an available stripe.

In block 340, the controller 120 may write the consolidated extracted valid data from the one or more functioning storage devices 140 in the storage array 130 and the reconstructed data of the failed storage device 140i that are associated with the first GCG 245 to a second GCG 245 (e.g., GCG 245b) in the storage array 130. The second GCG 245 may be any one of the plurality of available GCGs 245 in the storage array 130. As will be explained further with reference to FIGS. 5A-5F, the second GCG 245 may include a replacement storage device (not shown) that serves as a replacement for the failed storage device 140i.

In block 350, the controller 120 may reclaim the first GCG 245 in the storage array 130 identified for garbage collection. As will be explained further with reference to FIGS. 5A-5F, in an embodiment, the storage controller 120 may reclaim the first GCG 245 by erasing all of the blocks 210 within the first GCG 245, thus freeing up space in the first GCG for future data storage.

In the method 300, the controller 120 may iteratively perform block 310 through block 350 for each of the remaining GCGs 245 in the storage array 130 until the contents of the failed storage device 140i has been rebuilt. Once the failed storage device 140i has been rebuilt, the storage array 130 may recover to its original level of redundancy as it had prior to the failure of the failed storage device 140i and no longer operates in a degraded mode.

In some embodiments, the controller 120 may determine if one or more predetermined condition(s) concerning rebuilding of the failed storage device 140i have been met, and if so, perform a manual rebuild of the failed storage device. The manual rebuild may be performed so as to reduce the amount of time the storage array 130 needs to operate in the degraded mode. In some embodiments, the predetermined condition(s) concerning rebuilding of the failed storage device may include: (1) whether a rebuild timeout threshold for the failed storage device has been exceeded, (2) whether one or more GCGs 245 in the plurality of storage devices have not been written to within a predetermined amount of time, or (3) the availability of redundancy information (e.g., parity) sufficient to rebuild the failed storage device. The manual rebuild process will be described in more detail below with reference to FIG. 4.

Referring back to FIG. 2, in some embodiments, overprovisioned capacity within the storage array 130 may be temporarily employed as spare space during the storage device rebuild process. In these embodiments, the storage array 130 may have the benefit of maintaining full data redundancy protection while the failed storage device 140i is being rebuilt.

Overprovisioned capacity is storage capacity (e.g., one or more blocks 210 in storage devices 140) within the storage array 130 that may be reserved by the controller 120 for device management purposes such as garbage collection. The overprovisioned capacity may be allocated as spare space during the storage device rebuild process to temporarily store the rebuilt data of the failed storage device 140i. The data of the failed storage device 140i may be rebuilt using a storage device rebuild process such as that described above with reference to FIG. 3 and/or FIG. 4. Once the rebuild process using the overprovisioned space is complete, the storage array 130 may be restored to its original level of data redundancy protection prior to the failure of storage device 140i.

Figure 4:
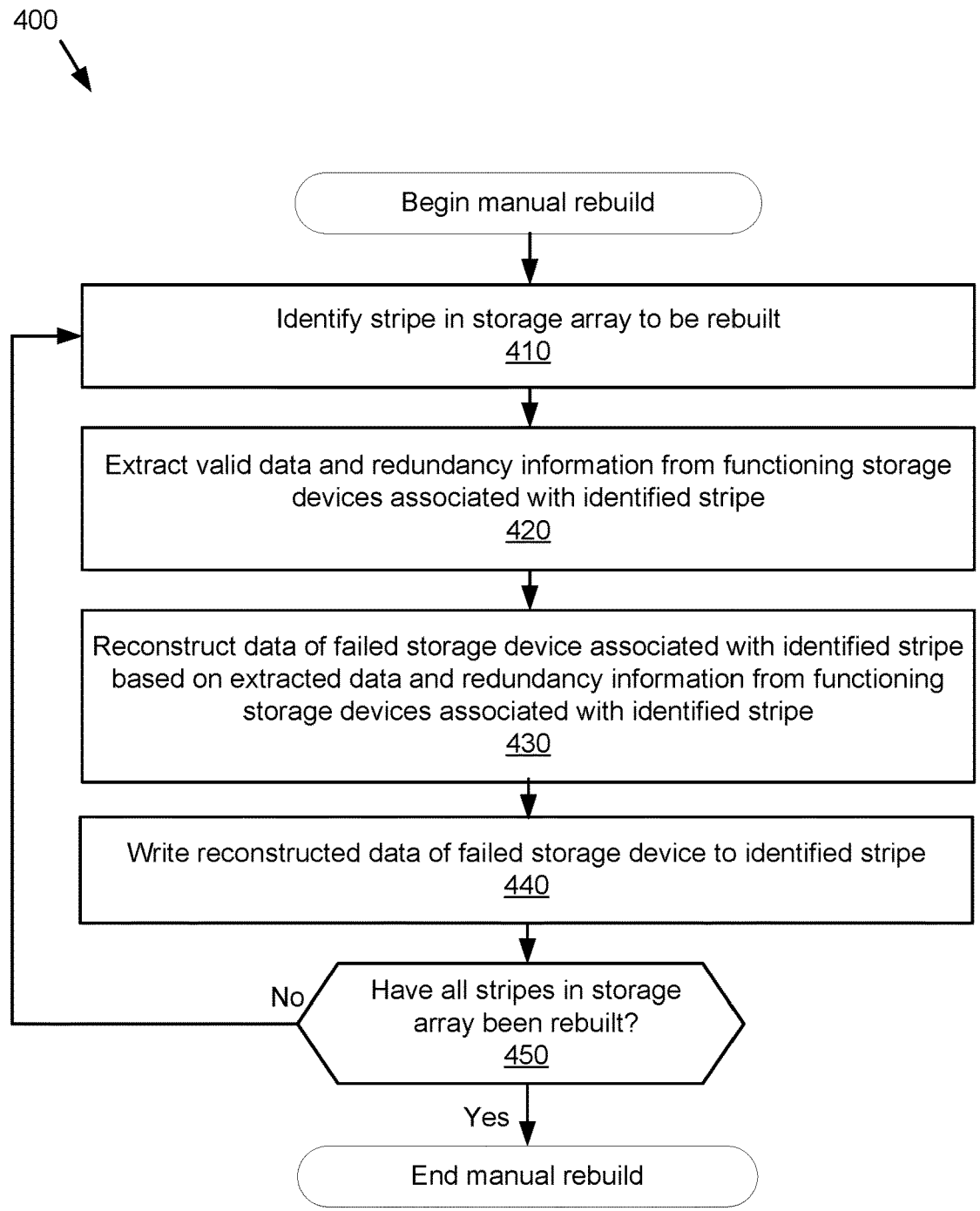
FIG. 4 is a flowchart of an example method for performing a manual rebuild of the failed storage device.

FIG. 4 is a flowchart of an example method 400 for performing a manual rebuild of the failed storage device 140i. As mentioned with reference to FIG. 3, the manual rebuild process may be performed if one or more of the aforementioned predetermined condition(s) have been met so as to complete the rebuild process for the failed storage device 140i.

The manual rebuild process begins in block 410, in which the controller 120 identifies a stripe 235 in the storage array 130 to be rebuilt. In some embodiments, the identified stripe 235 may be a stripe in a GCG 245 in the storage array 130 that has not yet undergone the garbage collection operation described above with reference to FIG. 3.

In block 420, the controller 120 may extract (e.g., read) valid data and redundancy information from the one or more functioning storage devices 140 in the storage array 130 that are associated with the identified stripe 235.

In block 430, the controller 120 may reconstruct the data of the failed storage device 140i associated with the identified stripe 235 based on the extracted valid data and redundancy information from the one or more functioning storage devices 140 in the storage array 130 that are associated with the identified stripe. In some embodiments, the data of the failed storage device may be reconstructed by performing an XOR operation on the extracted valid data and redundancy information.

In block 440, the controller 120 may write the reconstructed data of the failed storage device 140i to the identified stripe 235.

In block 450, the controller 120 may determine if all of the stripes 235 in the storage array 130 have been rebuilt. If this is the case, the manual rebuild process may end. However, if this is not the case, the controller 120 may proceed back to block 410 as shown to iteratively repeat the blocks 410 through 440 as just described for the remaining stripes 235 until the storage device rebuild process has been completed.

FIGS. 5A-5F are block diagrams of an example RAID 5 storage array 530 illustrating a method for performing a failed storage device rebuild in accordance with an embodiment. FIGS. 5A-5F show the storage array 530 at different periods of time t1-t6 occurring during the storage device rebuild process. It should be noted that the order in which the various actions illustrated in these figures are performed is not limited to that described, but rather may vary depending on embodiment. Further, it should be noted that while the following description concerns a storage array 530 that implements RAID 5, the present disclosure may apply to any data storage system that implements data redundancy and performs garbage collection known or contemplated.

Figure 5A:
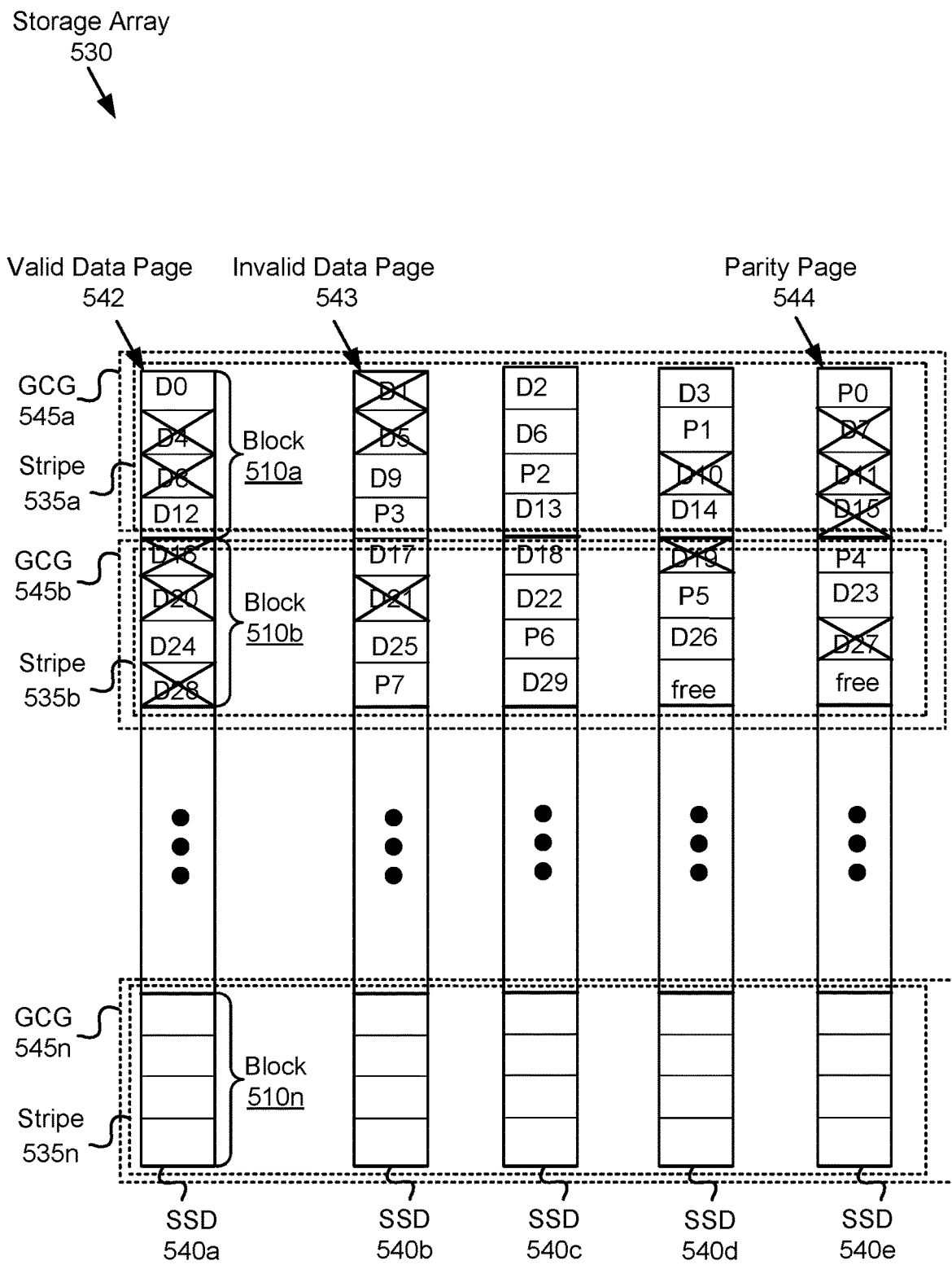
FIGS. 5A-5F are block diagrams of an example RAID 5 storage array 530 illustrating a method for performing a failed storage device rebuild in accordance with an embodiment.

As shown in FIG. 5A, the storage array 530 is an embodiment of the storage array 130 of FIG. 2 including five SSDs 540a-540e in a 4+1 RAID 5 configuration. Each SSD 540 may include a plurality of blocks 510a, 510b, . . . , 510n, each of which may be divided into a plurality of pages (e.g., valid data page 542, invalid data page 543 and parity page 544, respectively storing valid data D0, invalid data D1, and parity information P0). Additionally, some of the pages within blocks 510 may be in a "free" state in which no data has been written to them. For purposes of simplicity, only selected portions of the storage array 530 are depicted with stored data.

The storage array 530 includes a plurality of stripes 535a, 535b, . . . , 535n, in which each stripe 535 may include corresponding blocks 510 contained in the plurality of SSDs 540a-540e, as illustrated in the figure. Each stripe 535 includes a parity page 544 which supports recovery from a failure of a single SSD 540 in the storage array 530, as will be explained with reference to FIG. 5C below. It should be noted that while the storage array 530 implements page-level parity, in other embodiments block-level parity may be used in which a parity block (not shown), rather than parity page 544, stores the parity information for the respective stripe 535.

In some embodiments, the host 101 may write data to the storage array 530 using a data structuring methodology such as log-structuring. In a log-structured data organization, random writes of data may be grouped together and written sequentially to the storage array 530. In some embodiments, this process may be performed with software running on the host 101. For instance, FIG. 5A shows data pages D0, D1, D2, etc. stored sequentially within the storage array 530 in a log-structured manner, with parity pages P0, P1, P2, etc. being diagonally interleaved between the data pages in the array in accordance with the organization of a RAID 5 array.

The storage array 530 may be further arranged as a plurality of garbage collection groups (GCGs) 545a, 545b, . . . , 545n associated with a garbage collection process. Each GCG 545 may comprise the plurality of blocks 510 in the SSDs 540a-540e that are contained in the stripe 535. As will be explained in more detail with reference to FIG. 5C, the garbage collection process involves compacting and erasing blocks 510 in the SSDs 540a-540e in GCG 545 so as to free-up continuous usable space in the GCG for future writes.

FIG. 5A illustrates the RAID 5 storage array 530 at a time t1 during which the storage array 530 is normally operating. At this time, all five SSDs 540a-540e are operational and can service storage requests (e.g., read, write, etc.) from the host 101 as discussed with reference to FIG. 1. As part of the normal operation, the controller 120 may perform garbage collection operations on the storage array 530 by periodically and incrementally extracting and consolidating data within one or more valid data pages 542 in the storage array 530. As will be explained below with reference to FIG. 5C, it should be understood that these garbage collection operations may continue to be performed by the controller 120 throughout the operation of the storage array 530, including after the failure of a storage device within the array.

Figure 5B:
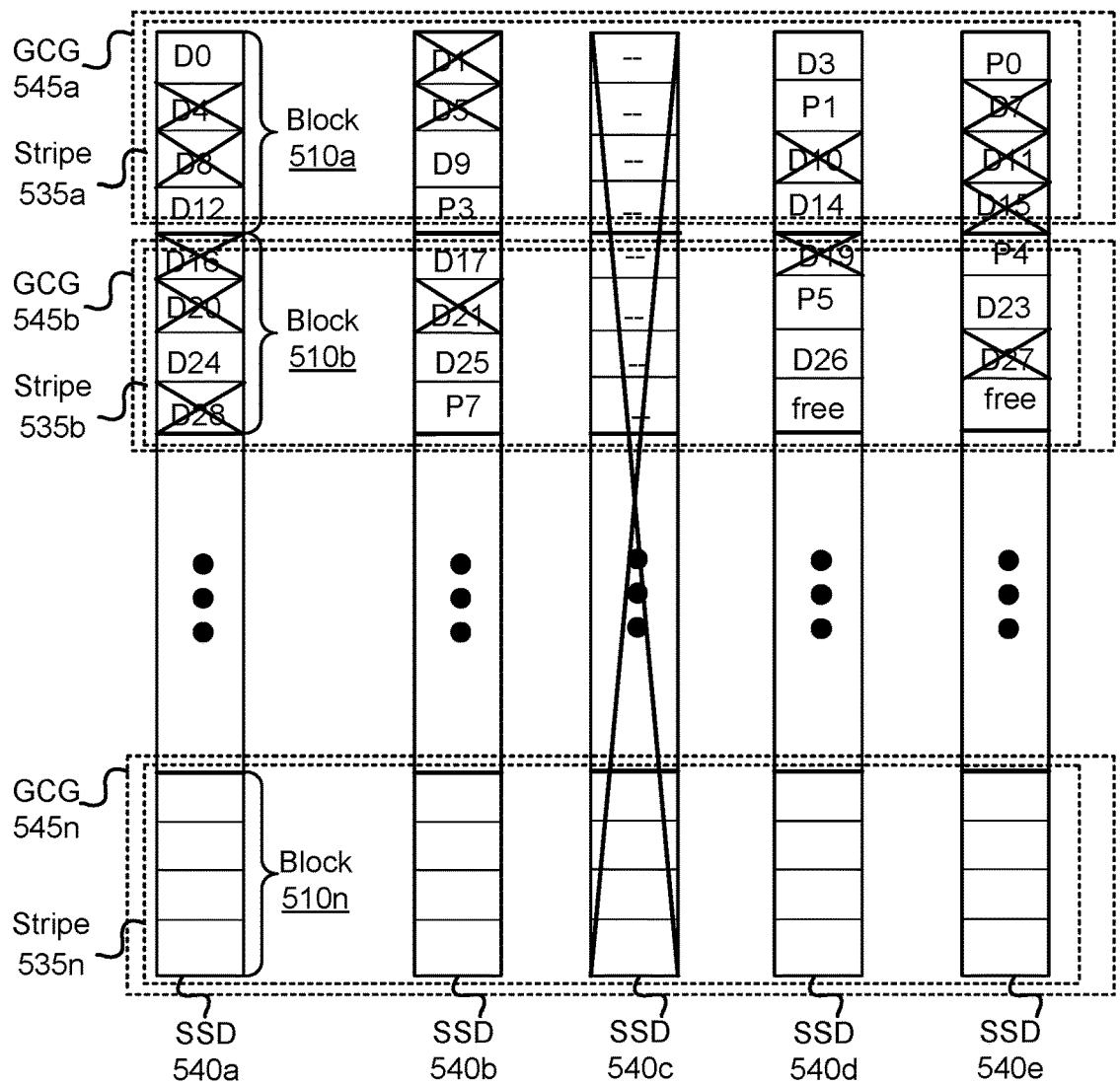

FIG. 5B illustrates the RAID 5 storage array 530 at a time t2 after the SSD 540c fails. Possible causes of the failure of SSD 540c include memory cell wear from extended use, missing redundancy information, power surges, virus attacks, and/or an inadvertent reconfiguration of the redundancy scheme. It should be understood that other SSDs in the storage array 530 other than SSD 540c may also fail for one or more of the reasons for which SSD 540c may fail.

Figure 5C:
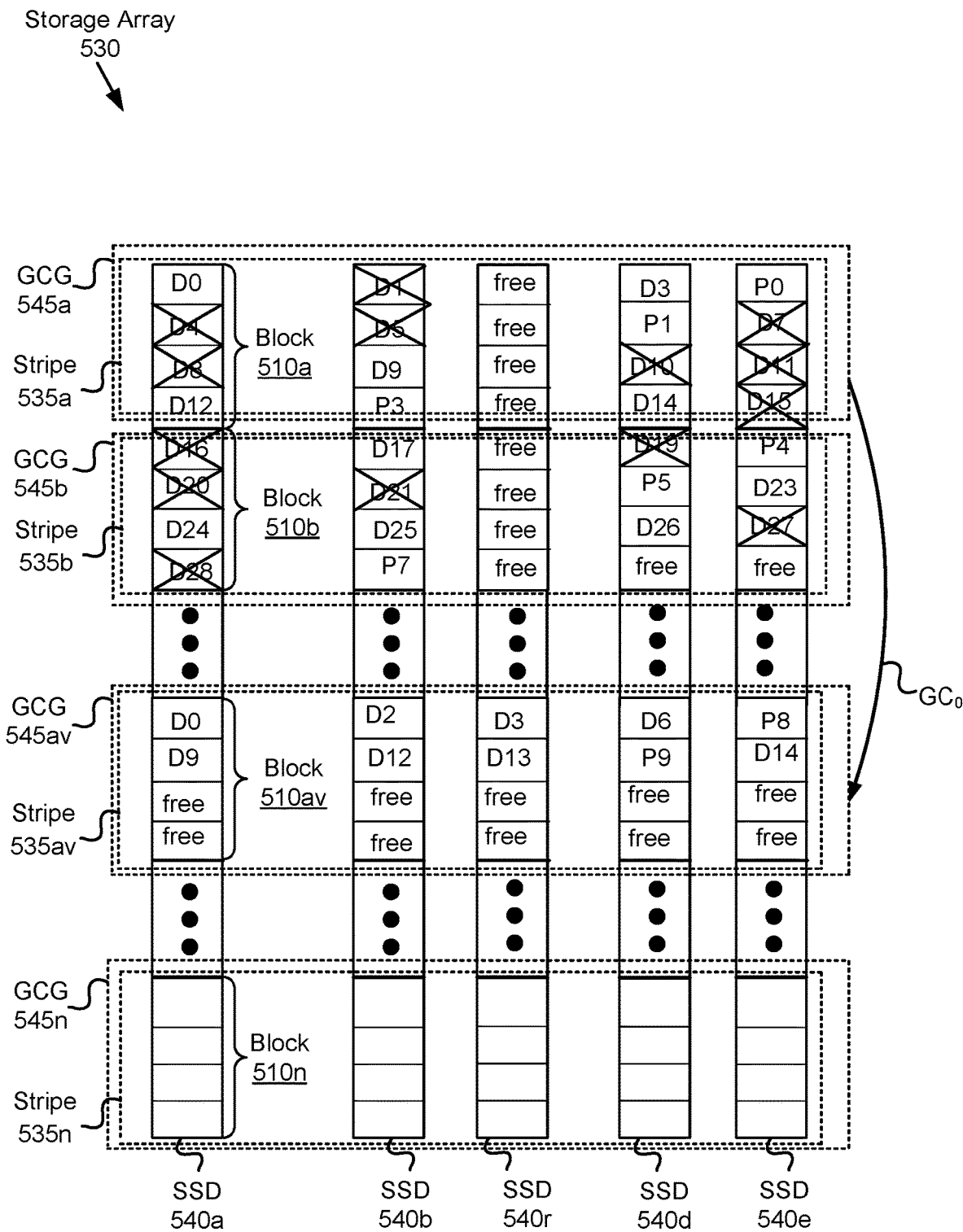

FIG. 5C illustrates the example RAID 5 storage array 530 at a time t3 including a replacement SSD 540r showing a first garbage collection operation $GC_0$ for a GCG 545a being performed as part of the storage device rebuild process for the failed SSD 540c. It should be noted that the following description for FIGS. 5C-5F corresponds to the storage device rebuild process described above with reference to FIG. 3 but as specifically applied to the storage array 530.

The replacement SSD 540r is a storage device that serves as a replacement for the failed SSD 530c and may be installed or activated in the storage array 530 after the failure of the SSD 530c. The replacement SSD 540r includes one or more available pages in a "free" state. It should be noted that although the following description of the storage rebuild process includes the replacement SSD 540r, in some embodiments the rebuild process may be performed without the replacement SSD 540r.

Referring to FIG. 5C, at time t3 the controller 120 may identify a first GCG 545 in the storage array 530 for garbage collection. The first GCG 545 may be any one of the plurality of GCGs 545 in the storage array 530 that have not been reclaimed in a prior iteration of the garbage collection process. Assuming, for instance, that the identified first GCG is GCG 545a, it is seen, referring to FIG. 5A above, that GCG 545a includes a plurality of valid data pages 542 (e.g., pages containing D0, D2, D3, D6, D9, D12, D13, and D14), a plurality of invalid data pages 543 (e.g., pages containing D1, D4, D5, D7, D8, D10, D11, and D15), and a plurality of parity pages 544 (e.g., pages containing P0, P1, P2, and P3), wherein the data D2, D6, and D13 and parity P2 are from the failed SSD 540c.

After identifying the first GCG 545a for garbage collection, the controller 120 may extract the one or more valid data pages and parity pages from the SSDs 540a, 540b, 540d, and 540e in the storage array 530 that have not failed (e.g., "functioning" SSDs 540) that are associated with the first GCG. In the illustrated embodiment, the controller 120 may extract the valid data pages containing data D0, D3, D9, D12, and D14 and parity pages containing parity information P0, P1, and P3 from GCG 545a and temporarily store the data and parity in memory in the controller 120.

After extracting the valid data pages associated with the first GCG 545a, the controller 120 may then reconstruct the valid data pages of the failed SSD 540c that are associated with the first GCG 545a based on the extracted valid data and redundancy information from the one or more functioning SSDs 540 in the storage array 530 that are associated with the first GCG 545. In the illustrated embodiment, the data D2 from the failed SSD 540c may be reconstructed by performing an XOR operation on the extracted valid data pages containing D0 and D3 and the parity page containing parity information P0 from the stripe 535a. Similarly, the data D13 may be reconstructed by performing an XOR operation the extracted valid data pages containing D12 and D14 and the parity page containing parity information P3.

After reconstructing the valid data pages associated with the first GCG 545a, the controller 120 may then compute the corresponding parity pages P8 and P9 associated with the extracted valid data pages from the functioning SSDs 540 and the reconstructed data pages of the failed SSD 540c. In one embodiment, each of the parity pages P8 and P9 may be computed by performing an XOR operation on the extracted valid data from the functioning SSDs 540a, 540b, 540d, and 540e and the reconstructed data from the failed SSD 540c. For instance, P8 and P9 may be generated using the operations XOR(D0, D2, D3, D6) and XOR(D9, D12, D13, D14), respectively.

After computing the corresponding parity pages associated with the first GCG 545a, the controller 120 may then consolidate the extracted valid data from the functioning SSDs 540a, 540b, 540d, and 540e, the reconstructed data from the failed SSD 540c and the computed parity pages that are associated with the first GCG 545. This consolidation may comprise optimally structuring the combination of the extracted valid data, the reconstructed data, and the redundancy information for efficient storage to one or more available stripe(s) 535 within the storage array 530. An example optimal structuring of the consolidated data based on the embodiment shown in FIG. 5C may be (D0, D2, D3, D6, P8), and (D9, D12, D13, P9, D14).

After consolidating the extracted valid data associated with the first GCG 545a, the controller 120 may then write the consolidated extracted valid data, the reconstructed data of the failed SSD 540c, and the computed parity pages to a second GCG 545av in the storage array 530. The second GCG 545av may be any one of the plurality of available GCGs 545 in the storage array 530. The second GCG 545av may include the replacement SSD 540r that serves as a replacement for the failed SSD 540c. In the example just mentioned, the consolidated data and parity (D0, D2, D3, D6, P8) may be sequentially written to the first row of GCG 545av whereas (D9, D12, D13, P9, D14) may be sequentially written to the second row of GCG 545av as shown in the figure.

Figure 5D:
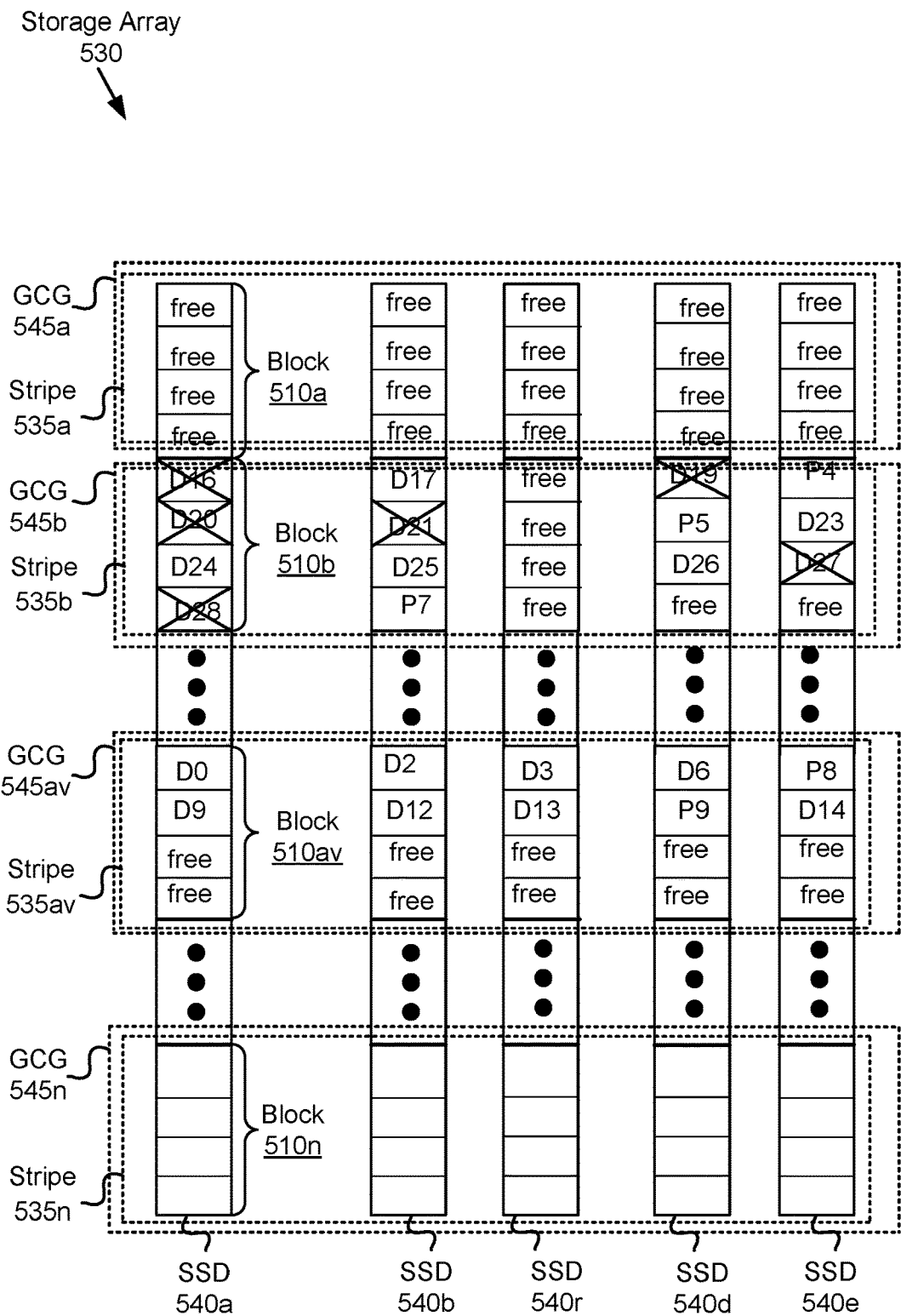

FIG. 5D illustrates the example RAID 5 storage array 530 at a time t4 showing a reclaiming process of the garbage collection operation for the GCG 545a. In executing this operation, the controller 120 may erase all of the blocks 510 within GCG 545a to free up space in the GCG for future data storage.

Figure 5E:
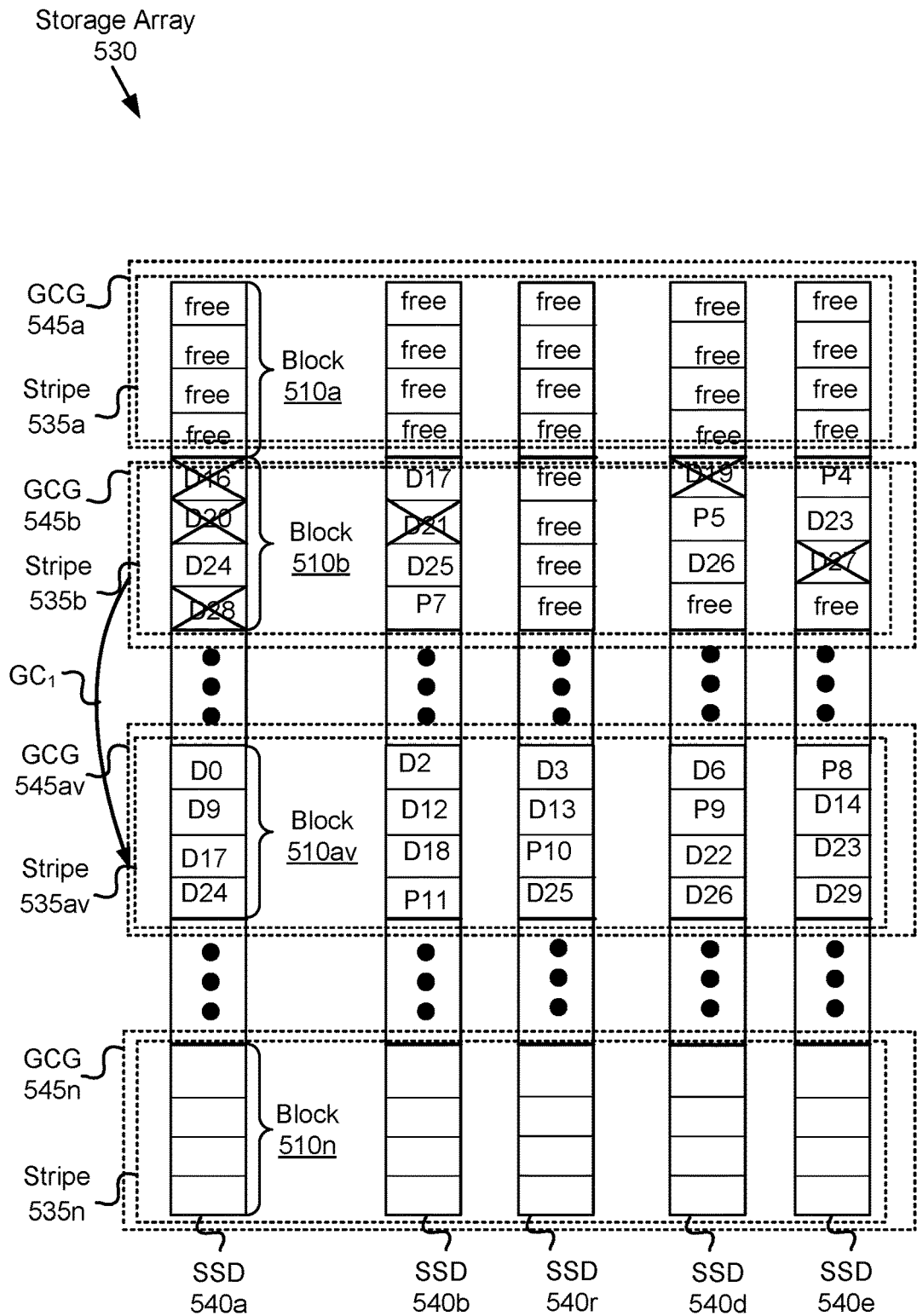

FIG. 5E illustrates the example RAID 5 storage array at a time t5 showing a second garbage collection operation for a second GCG 545b. As shown, the controller 120 may perform the second garbage collection $GC_1$, using operations similar to those discussed with reference to the first garbage collection operation $GC_0$. The extracted and consolidated valid data from the GCG 545b may be written to the same available GCG (e.g., GCG 545av) as was used for the first garbage collection operation $GC_0$ (as illustrated), or in some embodiments, to another available GCG. The controller 120 may then perform a reclaiming operation on the blocks within GCG 545b in a manner similar to that performed for the blocks within GCG 545a as described above with reference to the garbage collection operation $GC_0$.

The garbage collection operation as just described with reference to FIGS. 5C-5E may be iteratively repeated for the remaining GCGs 545 in the storage array 530 until the contents of the failed SSD 540c has been rebuilt.

Figure 5F:
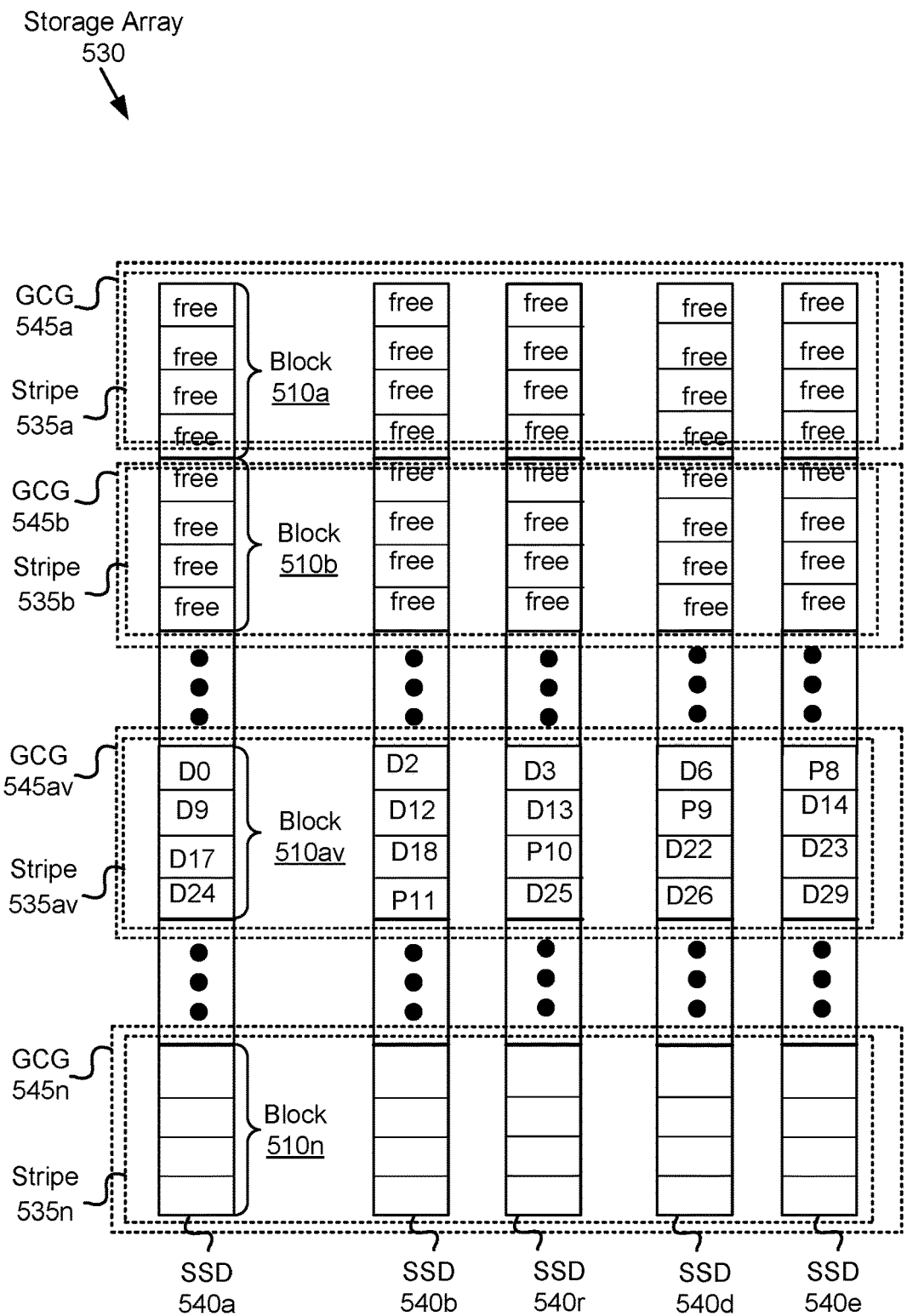

FIG. 5F illustrates the example RAID 5 storage array 530 at a time t6 after the failed storage device rebuild process has been completed. After the contents of the replacement SSD 540r have been rebuilt, the storage array 530 recovers to its original level of redundancy as it had prior to the failure of the failed SSD 540c and no longer operates in a degraded mode.

Systems and methods for rebuilding a failed storage device in a data storage system are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Figure 6:
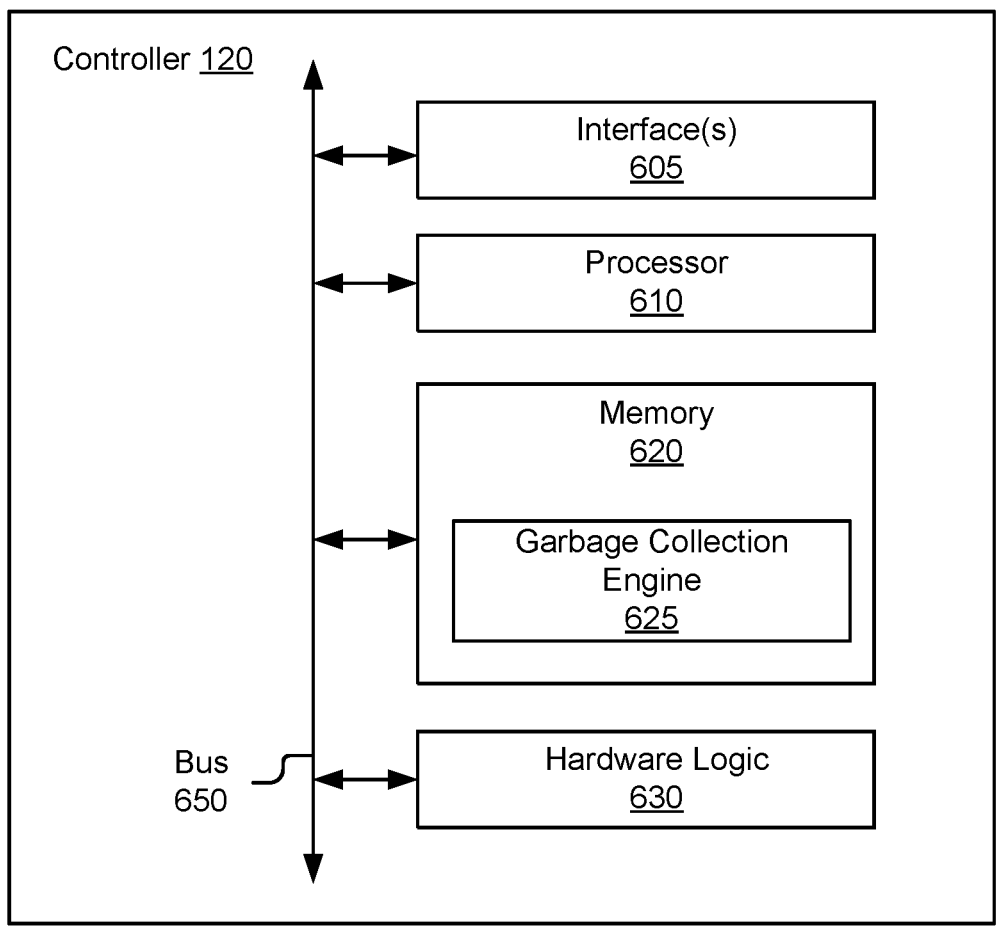
FIG. 6 is a block diagram of an example controller included in the data storage system of FIG. 1 in accordance with an embodiment.

FIG. 6 is a block diagram of an example controller 120 included in the data storage system 110 of FIG. 1 in accordance with an embodiment. As shown, the controller 120 may comprise, among other components, one or more interface(s) 605, a processor 610, a memory 620 containing a garbage collection engine 625, and in some embodiments, one or more hardware logic module(s) 630. However, it should be understood that the controller 120 may include alternative, additional and/or fewer components depending on the configuration, such as configurations combining elements, implementing elements in hardware vs. software, etc. A bus 650 may be used to communicatively couple the components of the controller 120.

The one or more interface(s) 605 may communicatively couple the controller 120 to the host 101 and/or the storage array 130. The one or more interface(s) 605 may include, but are not limited to, input/output (I/O) interface circuitry that uses appropriate communications protocol(s) for communicating with the host 101 and/or the storage array 130.

The processor 610, which may include one or more processing units, may be used to execute the instructions of various software programs contained in the memory 620. The processor 610 may include one or more processing units and/or cores, programmable integrated circuits such as application-specific integrated circuits (ASICs) or field-programmable gate arrays (FPGAs), or some combination thereof. The processor 610 may be based on various computing architectures including a complex instruction set computer (CISC) architecture, a reduced instruction set computer (RISC) architecture, or an architecture implementing a combination of instruction sets. It should be understood that other configurations of the processor 610 are possible.

The memory 620, which may include one or more non-transitory storage devices, may store software programs, firmware and/or data that are executed or otherwise processed by the processor 610. The memory 620 may comprise, for example, volatile memory such as dynamic random-access memory (DRAM) device(s), static random-access memory (SRAM) device(s), non-volatile memory such as electrically erasable programmable read-only (EEPROM) or flash memory devices, a combination of the foregoing, and/or some other suitable type of data storage medium.

The software and/or firmware stored in the memory 620 may include a garbage collection engine 625, which may include routines and/or instructions that when executed by the processor 610 may perform one or more of the various garbage collection and/or storage device rebuild operations for the storage array 130 as described above with reference to FIGS. 3, 4 and 5A-5F. In some embodiments, one or more hardware logic module(s) 630, such as ASICs, FPGAs, etc. may be employed instead of software and/or firmware in the memory 620 to perform one or more of the aforementioned garbage collection and/or storage device rebuild operations.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method for rebuilding a failed storage device in a storage array, the method comprising:
    identifying a first garbage collection group in the storage array for garbage collection;
    extracting valid data and redundancy information from one or more functioning storage devices in the storage array that are associated with the first garbage collection group;
    reconstructing data of the failed storage device that are associated with the first garbage collection group based on the extracted valid data and redundancy information from the one or more functioning storage devices that are associated with the first garbage collection group;
    consolidating the extracted valid data from the one or more functioning storage devices and the reconstructed data of the failed storage device that are associated with the first garbage collection group;
writing the consolidated extracted valid data from the one or more functioning storage devices and the reconstructed data of the failed storage device that are associated with the first garbage collection group to a second garbage collection group in the storage array; and
reclaiming the first garbage collection group identified for garbage collection.

2. The computer-implemented method of claim 1, wherein one or more of the identifying, extracting, reconstructing, consolidating and writing are performed in a periodic and incremental manner.

3. The computer-implemented method of claim 1, further comprising:
determining that a predetermined condition concerning the storage array has been met; and
responsive to determining that the predetermined condition concerning the storage array has been met, performing a manual rebuild of valid data of the failed storage device that have not yet been reconstructed.

4. The computer-implemented method of claim 3, wherein the predetermined condition concerning the storage array is selected from a group comprising: (1) a rebuild timeout threshold for the failed storage device has been exceeded and (2) one or more garbage collection groups in the storage array have not been written to within a predetermined amount of time.

5. The computer-implemented method of claim 1, wherein the storage array comprises one or more solid-state drives.

6. The computer-implemented method of claim 1, wherein the storage array is configured as a RAID array.

7. The computer-implemented method of claim 1, wherein the storage array is configured to support an erasure coding scheme.

8. The computer-implemented method of claim 1, wherein the storage array includes overprovisioned capacity that is configured as spare space to temporarily store reconstructed data of the failed storage device.

9. A data storage system, comprising:
a storage array including a plurality of storage devices; one or more processors; and
logic executable by the one or more processors to perform operations comprising:
identifying a first garbage collection group in the storage array for garbage collection;
extracting valid data and redundancy information from one or more functioning storage devices in the storage array that are associated with the first garbage collection group;
reconstructing data of a failed storage device in the storage array that are associated with the first garbage collection group based on the extracted valid data and redundancy information from the one or more functioning storage devices that are associated with the first garbage collection group;
consolidating the extracted valid data from the one or more functioning storage devices and the reconstructed data of the failed storage device that are associated with the first garbage collection group;
writing the consolidated extracted valid data from the one or more functioning storage devices and the reconstructed data of the failed storage device that are associated with the first garbage collection group to a second garbage collection group in the storage array; and
reclaiming the first garbage collection group identified for garbage collection.

10. The data storage system of claim 9, wherein one or more of the identifying, extracting, reconstructing, consolidating and writing are performed in a periodic and incremental manner.

11. The data storage system of claim 9, wherein the operations further comprise:
determining that a predetermined condition concerning the storage array has been met; and
responsive to determining that the predetermined condition concerning the storage array has been met, performing a manual rebuild of valid data of the failed storage device that have not yet been reconstructed.

12. The data storage system of claim 11, wherein the predetermined condition concerning the storage array is selected from a group comprising: (1) a rebuild timeout threshold for the failed storage device has been exceeded and (2) one or more garbage collection groups in the storage array have not been written to within a predetermined amount of time.

13. The data storage system of claim 9, wherein the storage array comprises one or more solid-state drives.

14. The data storage system of claim 9, wherein the storage array is configured as a RAID array.

15. The data storage system of claim 9, wherein the storage array is configured to support an erasure coding scheme.

16. The data storage system of claim 9, wherein the storage array includes overprovisioned capacity that is configured as spare space to temporarily store reconstructed data of the failed storage device.

17. A data storage system, comprising:
a storage array including a plurality of storage devices;
means for identifying a first garbage collection group in the storage array for garbage collection;
means for extracting valid data and redundancy information from one or more functioning storage devices in the storage array that are associated with the first garbage collection group;
means for reconstructing data of a failed storage device in the storage array that are associated with the first garbage collection group based on the extracted valid data and redundancy information from the one or more functioning storage devices that are associated with the first garbage collection group;
means for consolidating the extracted valid data from the one or more functioning storage devices and the reconstructed data of the failed storage device that are associated with the first garbage collection group;
means for writing the consolidated extracted valid data from the one or more functioning storage devices and the reconstructed data of the failed storage device that are associated with the first garbage collection group to a second garbage collection group in the storage array; and
means for reclaiming the first garbage collection group identified for garbage collection.

18. The data storage system of claim 17, wherein one or more of the means for identifying, means for extracting, means for reconstructing, means for consolidating and means for writing are configured to perform their respective actions in a periodic and incremental manner.

19. The data storage system of claim 17, further comprising:
   means for determining that a predetermined condition concerning the storage array has been met; and
   means for performing a manual rebuild of valid data of the failed storage device that have not yet been reconstructed, wherein the manual rebuild is responsive to determining that the predetermined condition concerning the storage array has been met.

20. An apparatus, comprising:
   one or more processors; and
   logic executable by the one or more processors, the logic comprising:
      means for identifying a first garbage collection group in a storage array for garbage collection;
      means for extracting valid data and redundancy information from one or more functioning storage devices in the storage array that are associated with the first garbage collection group;
      means for reconstructing data of a failed storage device in the storage array that are associated with the first garbage collection group based on the extracted valid data and redundancy information from the one or more functioning storage devices that are associated with the first garbage collection group;
      means for consolidating the extracted valid data from the one or more functioning storage devices and the reconstructed data of the failed storage device that are associated with the first garbage collection group;
      means for writing the consolidated extracted valid data from the one or more functioning storage devices and the reconstructed data of the failed storage device that are associated with the first garbage collection group to a second garbage collection group in the storage array; and
      means for reclaiming the first garbage collection group identified for garbage collection.

* * * * *